(12) United States Patent
Zhang et al.

(10) Patent No.: US 11,089,048 B2
(45) Date of Patent: Aug. 10, 2021

(54) IDENTIFYING SPAMMER PROFILES

(71) Applicant: Microsoft Technology Licensing, LLC, Redmond, WA (US)

(72) Inventors: Yongzheng Zhang, San Jose, CA (US); Kaiyu Yang, Sunnyvale, CA (US); Li Yang, Palo Alto, CA (US); Bing Wang, Mountain View, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 320 days.

(21) Appl. No.: 16/145,032

(22) Filed: Sep. 27, 2018

(65) Prior Publication Data

US 2020/0106804 A1    Apr. 2, 2020

(51) Int. Cl.
*H04L 29/06* (2006.01)
*H04L 12/58* (2006.01)
*G06N 20/00* (2019.01)

(52) U.S. Cl.
CPC ......... *H04L 63/1441* (2013.01); *G06N 20/00* (2019.01); *H04L 51/12* (2013.01)

(58) Field of Classification Search
CPC .. H04L 63/14; H04L 63/1433; H04L 63/1441
See application file for complete search history.

(56) References Cited

U.S. PATENT DOCUMENTS

| | | | | |
|---|---|---|---|---|
| 7,457,823 | B2* | 11/2008 | Shraim | H04L 51/12 |
| 7,548,956 | B1* | 6/2009 | Aoki | G06Q 10/107 |
| | | | | 709/204 |
| 8,898,786 | B1* | 11/2014 | Stibel | G06F 21/577 |
| | | | | 726/23 |
| 9,742,788 | B2* | 8/2017 | Hassanzadeh | G06F 21/64 |
| 2010/0162396 | A1* | 6/2010 | Liu | H04L 63/1425 |
| | | | | 726/23 |
| 2013/0227016 | A1* | 8/2013 | Risher | G06F 21/31 |
| | | | | 709/204 |
| 2015/0067842 | A1* | 3/2015 | Stibel | H04L 63/1441 |
| | | | | 726/22 |
| 2016/0078370 | A1* | 3/2016 | McEwen | G06F 21/604 |
| | | | | 705/5 |
| 2019/0089731 | A1* | 3/2019 | Park | H04L 63/1416 |
| 2020/0053111 | A1* | 2/2020 | Jakobsson | H04L 51/12 |

* cited by examiner

*Primary Examiner* — Esther B. Henderson
(74) *Attorney, Agent, or Firm* — Hickman Becker Bingham Ledesma LLP

(57) ABSTRACT

A spammer profile detector uses multi-stage machine learning approach, where a content-based machine learning model, a connection graph machine learning model, and a behavior-based machine learning model are used sequentially, each model generating a score indicating the likelihood that a profile is a spammer profile. The content-based machine learning model examines and evaluates information stored in a member profile. The connection graph machine learning model examines and evaluates a member's connections. The behavior-based machine learning model examines and evaluates activities of a member represented by a member profile. The score produced by the spammer profile detector can be used to determine whether the profile should be flagged as a spammer profile, whether the profile should be omitted when determining a count of the total number of active member profiles within the system, whether the profile should be restricted or removed from the system, etc.

20 Claims, 4 Drawing Sheets

IDENTIFYING SPAMMER PROFILES

TECHNICAL FIELD

This application relates to the technical fields of software and/or hardware technology and, in one example embodiment, to system and method to identify spammer profiles in an on-line connection network system.

BACKGROUND

An on-line connection network is a platform for connecting people in virtual space. It may be a web-based platform such as a connection networking web site, and may be accessed by a user via a web browser or via a mobile application provided on a mobile device. An on-line connection network may be designed specifically for the business community, where registered members establish and document networks of people they know and trust professionally. Each registered member may be represented by a member profile. A member profile may be represented by one or more web pages, or a structured representation of the member's information in XML (Extensible Markup Language), JSON (JavaScript Object Notation) or similar format. A member's profile web page of a connection networking web site may emphasize employment history and professional skills of the associated member.

As a member profile can be created, generally, by any computer user that has access to the Internet, there is an opportunity for unscrupulous individuals to attempt to use the connection network for spamming, phishing, and, possibly, other illicit activities. Profiles created for purposes other than the purpose intended by the provider of the on-line connection network system can be quite prominent in connection networks, e-commerce marketplaces, and other on-line platforms. Such profiles can lead to various damages to the platform and its members. In a professional connection network content, for example, such profiles can damage the trust between members and can jeopardize the job opportunity flow in the associated economy graph. Existing solutions in this space are mostly relevant to email spam detection.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
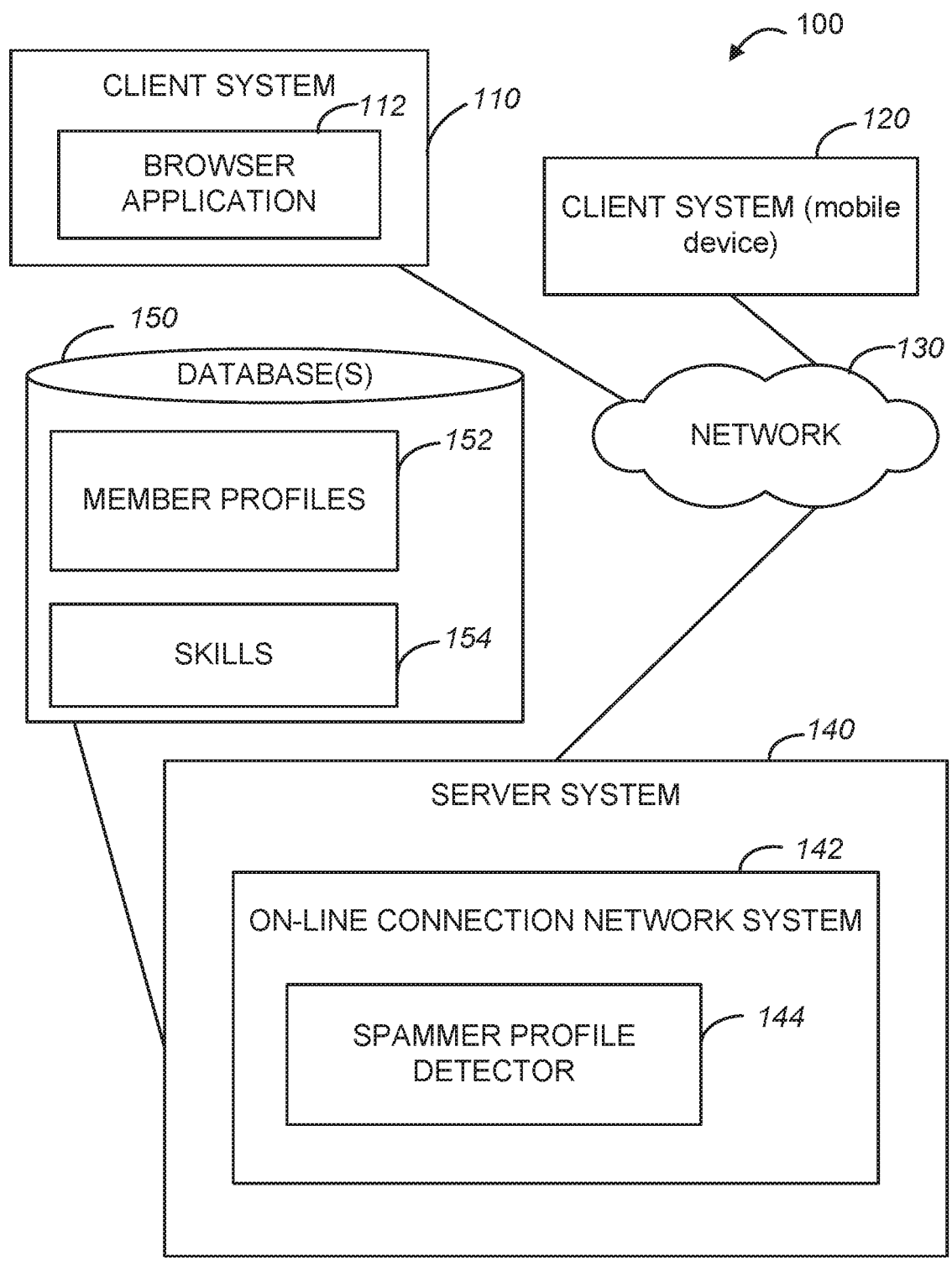
FIG. 1 is a diagrammatic representation of a network environment within which an example method and system to identify spammer profiles in an on-line connection network may be implemented.

A method and system to identify spammer profiles in an on-line connection network system are described. In the following description, for purposes of explanation, numerous specific details are set forth in order to provide a thorough understanding of an embodiment of the present invention. It will be evident, however, to one skilled in the art that the present invention may be practiced without these specific details.

As used herein, the term "or" may be construed in either an inclusive or exclusive sense. Similarly, the term "exemplary" is merely to mean an example of something or an exemplar and not necessarily a preferred or ideal means of accomplishing a goal. Additionally, although various exemplary embodiments discussed below may utilize Java-based servers and related environments, the embodiments are given merely for clarity in disclosure. Thus, any type of server environment, including various system architectures, may employ various embodiments of the application-centric resources system and method described herein and is considered as being within a scope of the present invention.

For the purposes of this description the phrases "an on-line connection networking application" and "an on-line connection network system" may be referred to as and used interchangeably with the phrase "an on-line connection network" or merely "a connection network." it will also be noted that an on-line connection network may be any type of an on-line connection network, such as a professional network, an interest-based network, or any on-line networking system that permits users to join as registered members. Each member of an on-line connection network is represented by a member profile (also referred to as a profile of a member or simply a profile). The profile information of a connection network member may include various information such as the name of a member, current and previous geographic location of a member, current and previous employment information of a member, information related to education of a member, information about professional accomplishments of a member, publications, patents, professional skills, etc. A member profile may also include or be associated with comments or recommendations from other members of the on-line connection network, with links to other network resources, such as, e.g., publications, etc.

An on-line connection networking system may be designed to allow registered members to establish and document networks of people they know and trust professionally. Any two members of a connection network may indicate their mutual willingness to be "connected" in the content of the connection network, in that they can view each other's profiles, profile recommendations and endorsements for each other and otherwise be in touch via the connection network. Members that are connected in this way to a particular member may be referred to as that particular member's connections or as that particular member's network. A member profile may also include a link that indicates that another member profile is "following" that profile. The follower member profile, in turn, includes a link indicating that the profile follows another specific member profile. A member represented by a follower member profile can receive updates associated with the profile being followed via their news feed, while the profile that is being followed does not receive any updates regarding the follower member profile (unless the two member profiles follow each other).

While in many cases member profiles in an on-line connection network system represent members that desire to connect with other individuals in a professional community, some of the profiles may be used for illicit purposes or for purposes other than the purpose intended by the provider of the on-line connection network system. Those profiles that may mislead other members or interfere with other members' activities (e.g., by sending unwanted information) are termed spammer profiles for the purposes of this description.

The technical problem of increasing accuracy of automatically determining that a member profile is a spammer profile is addressed by the methodologies described herein. A spammer profiles detection system, also termed a spammer profile detector uses multi-stage machine learning approach, where a content-based machine learning model (that examines and evaluates information stored in a member profile), a connection graph machine learning model (that examines and evaluates a member's connections), and a behavior-based machine learning model (that examines and evaluates activities of a member represented by a member profile) are used sequentially, each model generating a score indicating the likelihood that a profile is a spammer profile. For the purposes of this description, a member profile that is the subject of the process of determining whether it is potentially a spammer profile is termed a subject member profile.

A spammer profile detector may be described as including three main components—a profile detector, a connection detector, and a behavior detector. The profile detector is the least computationally extensive out of three. It only considers the profile information, which highly vary, as a spammer may create a spammer member profile by imitating an existing profile (e.g., creating a profile that resembles the member profile of a celebrity). As such, the profile detector serves as the first detector with relatively low precision and recall. The connection detector examines the properties of the connection network of the subject member profile and flags any member profile with non-healthy topological connections. As this analysis could lead to high false positive rate for those harmless members who are aggressive in trying to make new connections, the behavior detector is invoked if the analysis performed by the connection detector indicates that the subject member profile is potentially a spammer member profile. The behavior detector examines behavior originated from the subject member profile in order to either confirm that the behavior is healthy and further lower the false positive rate or to confirm that the subject member profile is to be flagged as a spammer profile.

The profile detector uses a content-based machine learning model that examines and evaluates information stored in a member profile and produces a score that indicates the likelihood of the subject member profile being a spammer member profile. This score may be termed a content-based score. The content-based machine learning model is built using term frequency-inverse document frequency (TF-IDF)-based feature vector space and a Support Vector Machine (SVM), or any advanced deep learning algorithm. In a professional connection network, where member profiles present a view of one's professional background, any conflicts within the subject member profile will be treated as indicative of a spammer profile. Below are some examples of data in a subject member profile that is treated as a conflict or inconsistency.

a. Email address is unrelated or does not include the member's first name and/or last name.

b. Email domain name and/or the phone number associated with the subject member profile is not related to any of the locations implicitly or explicitly indicated in the subject member profile (e.g., the location of current or past employment, the location of the school the member listed as having attended, etc.).

c. The subject member profile is incomplete (e.g., has very little information about the member's professional/educational background) and hasn't been updated in a long time, while the login activity of the member is high.

d. The work location listed in the subject member profile does not match the location associated with the member's login Internet Protocol (IP) address.

e. The member's education and work experience is inconsistent with the member's connections distribution. (E.g., none of the member's connections are from the school the member listed as having attended or none of the member's connections are or were employed at any of the companies listed by the member as having worked at.)

As mentioned above, the content-based machine learning model produces a content-based score. The content-based score is used by the spammer profile detector to determine whether the subject member profile is unlikely to be a spammer member profile or, if this score is above a certain predetermined threshold, continue evaluating of the subject member profile by the connection detector.

The connection detector calculates a score termed the connections score. In the connection detector, an EdgeRank-like algorithm can be applied to identify a possible spammer farm (one or more spammer member profiles). The connections of a subject member profile are ranked based on factors such as 1) affinity between the subject member profile and a respective connection, and 2) weight that reflects interaction types and intensity between the subject member profile and a respective connection. In addition to that, since one's network usually has quite salient professional footprint, the connection detector is configured to leverage the following features that may be indicative of the subject member profile being a spammer member profile.

a. Homogeneity of diversity of the connections of the subject member profile, including professional career, geographic locations, age, gender etc. (e. g., a member's connection network being diverse in way that spans unrelated professions, industries, and geographic locations may be indicative of the subject member profile being a spammer member profile).

b. Geographic location associated with the member's login IP address as compared with the distribution of geographic locations of the member's connections (e. g., geographic locations of most of the member's connections being different from the geographic location associated with the member's login IP address may be indicative of the subject member profile being a spammer member profile).

c. Mutual professional local cluster similarity (e. g., lack of similarity of professional background of connections that have the same geographic location as that of the subject member profile may be indicative of the subject member profile being a spammer member profile).

d. Demographics of the member's connections (e. g., connections of the subject member profile being predominantly from a certain age group or gender may be indicative of the subject member profile being a spammer member profile).

e. Orientation pattern of connection invitations (e. g., if all or most of the member's connections result from invitations originated from the subject member profile, this may be indicative of the subject member profile being a spammer member profile).

As mentioned above, connection detector calculates a score termed the connections score. The health index is used by the spammer profile detector to determine whether the subject member profile is unlikely to be a spammer member profile or, if this score is above a certain predetermined threshold, continue evaluating of the subject member profile by the behavior detector.

The behavior detector monitors activities that originate from the subject member profile and activities that are directed to the subject member profile. Because in a professional connection network a member's activities on the web site are expected to be profession-related driven, various anomalies in that pattern will be treated as indicative of a spammer profile. Below are some examples of behavior associated with the subject member profile that is treated as an inconsistency.

a. The member represented by the subject member profile has never used premium/paid services subscription.

b. The content of a message that originated from the subject member profile does not match education and profession background at both sides of the connection edge (e.g., the message content does not match the education and profession background of both the sender and the recipient may be indicative of the associated subject member profile of the sender being a spammer member profile).

c. Absence of professional skills and mutual endorsement from non-spam member profiles may be indicative of the subject member profile being a spammer member profile.

d. The subject member profile does not originate activities that are profession related (e.g., job search, follow, post, comment), and instead originate spam-like behavior, such as messaging.

e. The subject member profile originates batches of connection invitations.

f. The subject member profile is seldom or never updated.

g. The subject member profile originates the number of follow actions that is greater than a predetermined threshold in a given time period, which is termed aggressive following for the purposes of this description (e.g., more than 10 follow actions in the period of 24 hours).

h. The subject member profile has previously been reported as sending spam messages.

In some embodiments, the behavior detector executes a text classification model configured to recognize whether a given message is spam, e.g., based on the presence of certain phrases in the message, based on the number and/or type of the intended recipients, etc.

Upon completion of the evaluation of a subject member profile, the spammer profile detector assigns a score to the subject member profile. This score can be used to determine whether the profile should be flagged, within the on-line connection network system, as a spammer profile, whether the profile should be omitted when determining a count of the total number of active member profiles within the system or when determining which profiles to exclude from a targeted campaign, whether the profile should be restricted or removed from the system, etc. Effectively addressing the problem of detecting spammer profile may improve member's efficiency within the connection network and contribute to overall satisfaction and happiness of the on-line users. While the spammer profile detector that includes a profile detector, a connection detector, and a behavior detector can be used beneficially for offline spammer detection, most of its components do not contain expensive connection topological computation and thus can be used to create a light-weight online machine learning solution.

By utilizing the three-stage analysis described herein, the spammer profile detector may be able identify spammer profile in a resource-efficient way, where light-weight processes are used for most profiles and more resource-intensive processes are only used on those profiles that have been identified as associated with greater indications of being spammer profiles. This is an improvement over other methods of identifying spammer profiles which may be highly effective but are too resource intensive to be used in an on-line network with millions of profiles. An example spammer profile detection system may be implemented in the content of a network environment 100 illustrated in FIG. 1.

As shown in FIG. 1, the network environment 100 may include client systems 110 and 120 and a server system 140. The client system 120 may be a mobile device, such as, e.g., a mobile phone or a tablet. The server system 140, in one example embodiment, may host an on-line connection network system 142. As explained above, each member of an on-line connection network is represented by a member profile that contains personal and professional information about the member and that may be associated with connection links that indicate the member's connection to other member profiles in the on-line connection network. Member profiles and related information may be stored in a database 150 as member profiles 152. The database 150 also stores skills 154.

The client systems 110 and 120 may be capable of accessing the server system 140 via a communications network 130, utilizing, e.g., a browser application 112 executing on the client system 110, or a mobile application executing on the client system 120. The communications network 130 may be a public network (e.g., the Internet, a mobile communication network, or any other network capable of communicating digital data). As shown in FIG. 1, the server system 140 also hosts a spammer profile detector 144. The spammer profile detector 144 is configured to identify spammer profiles in an on-line connection network, applying methodologies discussed herein. An example spammer profile detector 144 is illustrated in FIG. 2.

Figure 2:
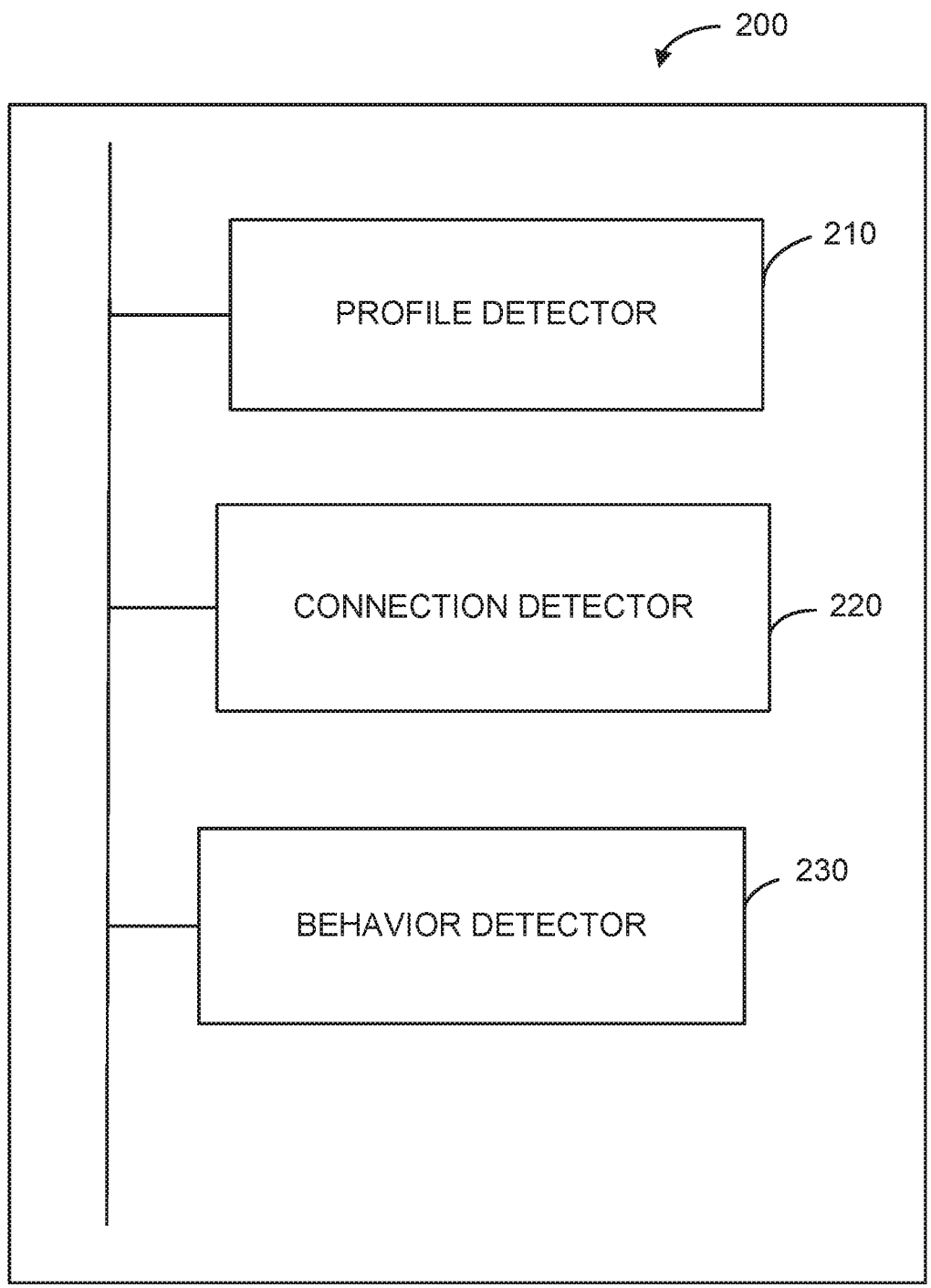
FIG. 2 is block diagram of a system to identify spammer profiles in an on-line connection network, in accordance with one example embodiment.

FIG. 2 is a block diagram of a system 200 to detect spammer member profiles in an on-line connection network. As shown in FIG. 2, the system 200 includes a profile detector 210, a connection detector 220, and a behavior detector 230. The profile detector 210 uses a content-based machine learning model takes information stored in the member profile as input and produces a content-based score that indicates consistency of the information stored in a subject member profile. The content-based score is used to determine whether to continue the investigation of the subject member profile by engaging the connection detector 220. In some embodiments, the content-based score is increased in response to determining that similarity between an email address associated with the subject member profile and a name of a member represented by the subject member profile is below a predetermined threshold. In another example, the content-based score is increased in response to determining that geographic location indicated in the subject member profile is inconsistent with geographic location associated with an IP address associated with a login session for the subject member profile in the on-line connection network system.

The connection detector 220 takes information about connections of the subject member profile in the on-line connection network system as input and produces a score termed the connections score. The connections score is used to determine whether to continue the investigation of the subject member profile by engaging the behavior detector 230. The connection detector 220 uses an EdgeRank-like machine learning model to assign respective ranks to connections of the subject member profile based on affinity between the member profile and a respective connection and a weight that reflects interaction types and intensity between the member profile and a respective connection. The connection ranks generated for connections of the subject member profile can be used as the final or an intermittent connections score (e. g., by adding the respective ranks, calculating their average, or combining the respective ranks in some other ways). In some embodiments, the connection score is increased in response to determining that a certain percentage of connections of the subject member profile are from a certain demographic group (e. g., seniors, which may indicate predatory spammer behavior). In some embodiments, the connection score is increased in response to determining that a certain percentage of connections of the member profile originated from invitations issued from the member profile.

The behavior detector 230 takes as input information representing events originated with the subject member profile in the on-line connection network system and produces a final score. This final score can be used to determine whether the profile should be flagged, within the on-line connection network system, as a spammer profile, whether the profile should be omitted when determining a count of the total number of active member profiles within the system or when determining which profiles to exclude from a targeted campaign, whether the profile should be restricted or removed from the system, etc.

The behavior detector 230 executes a text classification model configured to recognize whether a message content is indicative of spam. The final score can be increased in response to determining that a number of follow actions initiated from the member profile within a certain time period is greater than a threshold value and/or in response to determining that the member profile includes a link to a web site previously identified as a spammer web site. In some embodiments, the behavior detector 230 uses the connections score generated by the connection detector 220 as input to the machine learning model executed by the behavior detector 230, and the connection detector 220 uses the content-based score generated by the profile detector 210 as input to the machine learning model executed by the connection detector 220. Some operations performed by the system 200 may be described with reference to FIG. 3.

Figure 3:
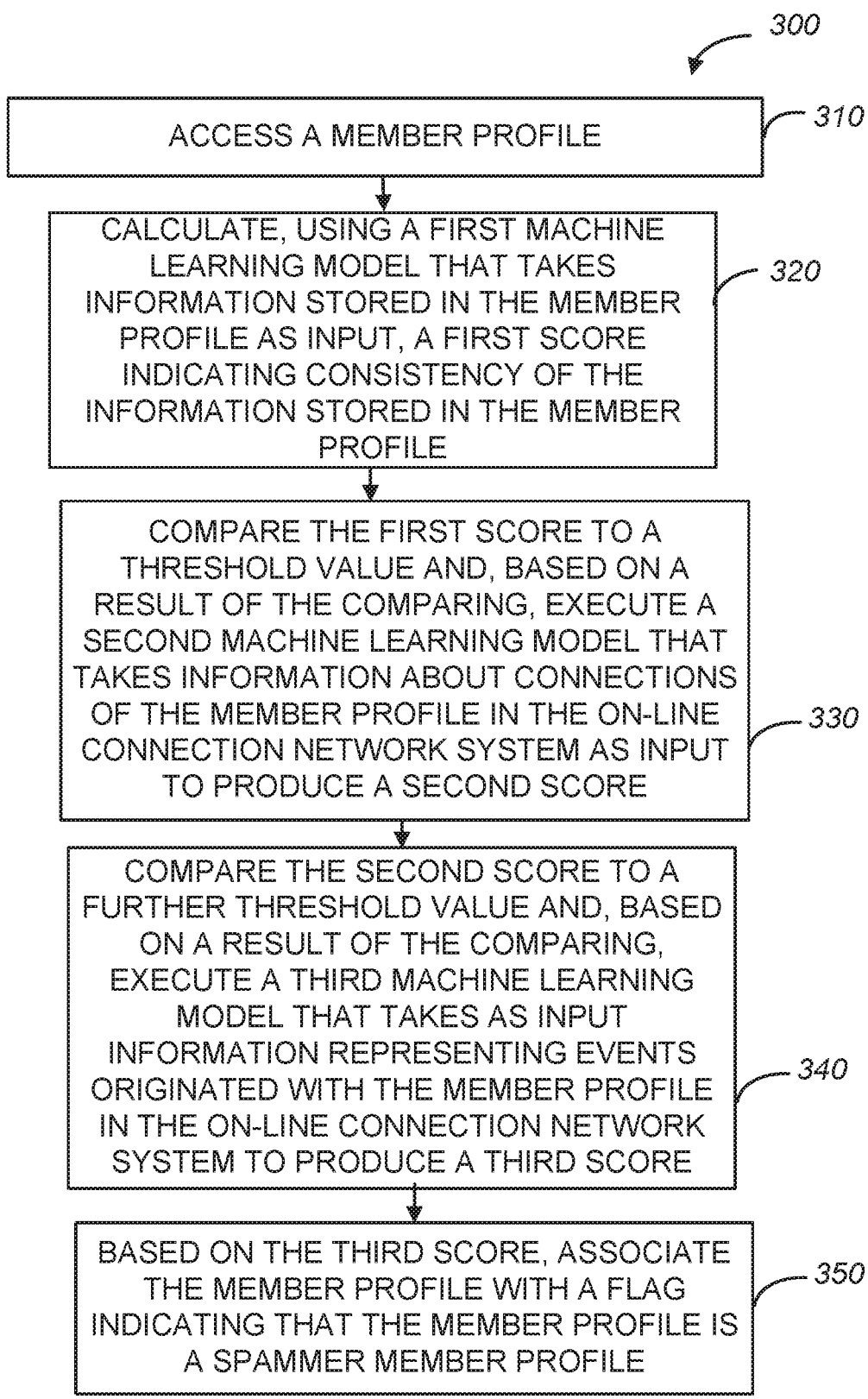
FIG. 3 is a flowchart illustrating a method to identify spammer profiles in an on-line connection network, in accordance with an example embodiment.

FIG. 3 is a flowchart of a method 300 to facilitate a career transition in an on-line connection network 142 of FIG. 1. The method 300 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the server system 140 of FIG. 1 and, specifically, at the system 200 shown in FIG. 2.

As shown in FIG. 3, the method 300 commences at operation 310, which is accessing a member profile representing a user in an on-line connection network system. Calculating, using a first machine learning model that takes information stored in the member profile as input, a first score indicating consistency of the information stored in the member profile is performed at operation 320. At operation 330, the system 200 of FIG. 2 compares the first score to a threshold value and, based on a result of the comparing, executes a second machine learning model that takes information about connections of the member profile in the on-line connection network system as input and produces a second score. The comparing of the second score to a further threshold value is performed at operation 340. Based on a result of the comparing, a third machine learning model is executed. The third machine learning model takes as input information representing events originated with the member profile in the on-line connection network system and produces a third score. At operation 350, the member profile is assigned a flag indicating that the member profile is a spammer member profile, based on the third score.

Figure 4:
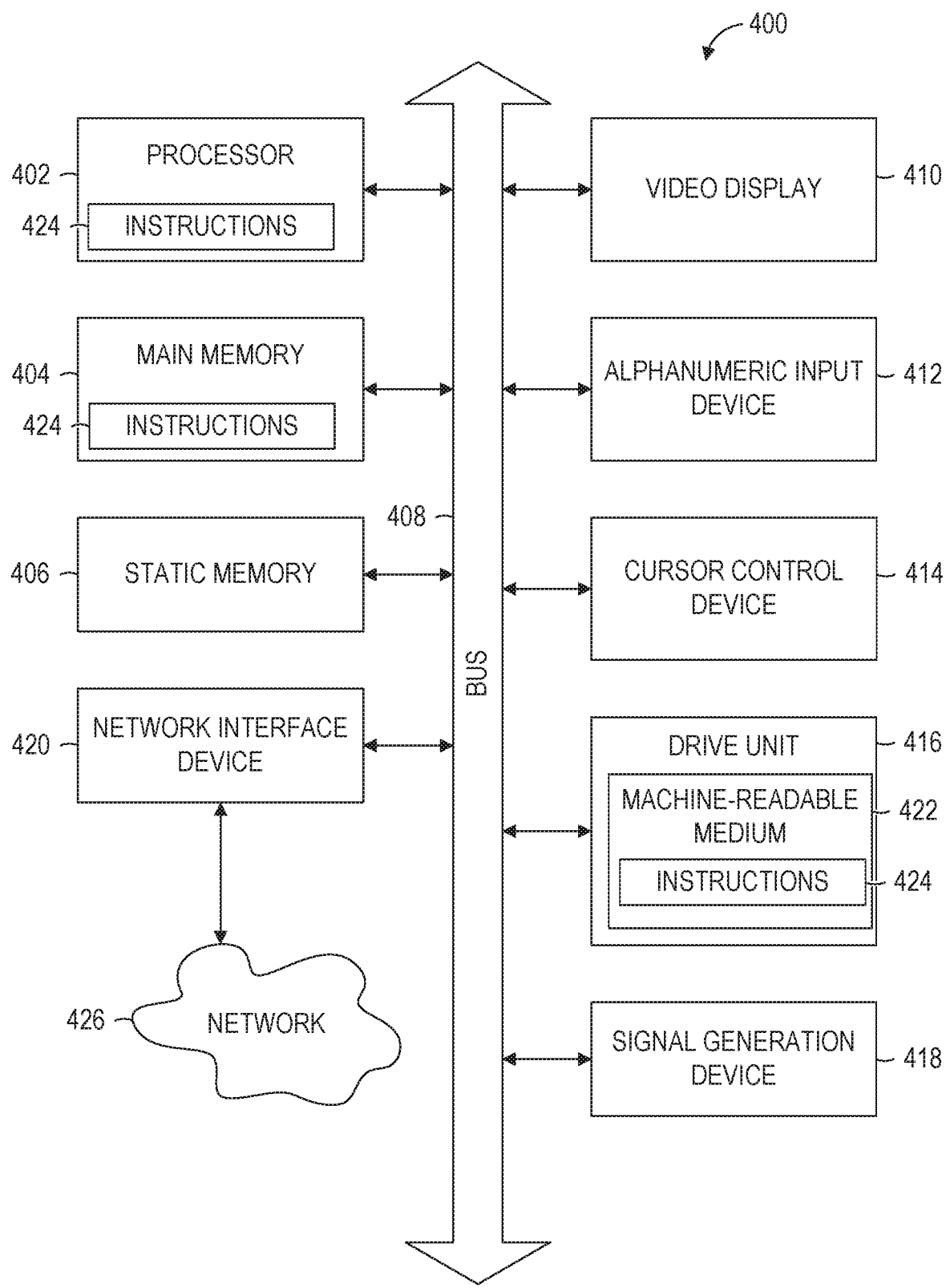
FIG. 4 is a diagrammatic representation of an example machine in the form of a computer system within which a set of instructions, for causing the machine to perform any one or more of the methodologies discussed herein, may be executed.

FIG. 4 is a diagrammatic representation of a machine in the example form of a computer system 400 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 404. The computer system 400 may further include a video display unit 410 (e.g., a liquid crystal display (LCD) or a cathode ray tube (CRT)). The computer system 400 also includes an alpha-numeric input device 412 (e.g., a keyboard), a user interface (UI) navigation device 414 (e.g., a cursor control device), a disk drive unit 416, a signal generation device 418 (e.g., a speaker) and a network interface device 420.

The disk drive unit 416 includes a machine-readable medium 422 on which is stored one or more sets of instructions and data structures software 424) embodying or utilized by any one or more of the methodologies or functions described herein. The software 424 may also reside, completely or at least partially, within the main memory 404 and/or within the processor 402 during execution thereof by the computer system 400, with the main memory 404 and the processor 402 also constituting machine-readable media.

The software 424 may further be transmitted or received over a network 426 via the network interface device 420 utilizing any one of a number of well-known transfer protocols (e.g., Hyper Text Transfer Protocol (HTTP)).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Modules, Components and Logic

Certain embodiments are described herein as including logic or a number of components, modules, or mechanisms. Modules may constitute either software modules code embodied (1) on a non-transitory machine-readable medium or (2) in a transmission signal) or hardware-implemented modules. A hardware-implemented module is tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at leak partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs).)

Thus, a method and system to identify spammer profiles in an on-line connection network has been described. Although embodiments have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense.

The invention claimed is:

1. A computer implemented method comprising:
  accessing a member profile representing a user in an on-line connection network system;
  calculating, using a first machine learning model that takes information stored in the member profile as input, a first score indicating consistency of the information stored in the member profile;
  comparing the first score to a threshold value and, based on a result of the comparing, executing a second machine learning model that takes information about connections of the member profile in the on-line connection network system as input and produces a second score;

comparing the second score to a further threshold value and, based on a result of comparing the second score to the further threshold value, executing a third machine learning model that takes as input information representing events originated with the member profile in the on-line onnection network system and produces a third score; and using at least one processor, based on the third score, associating the member profile with a flag indicating that the member profile is a spammer member profile;

wherein the first machine learning model is different than the second machine learning model and the third machine learning model;

wherein the third machine learning model is different than the second machine learning model;

wherein the first score is calculated before the second score and the second score is calculated before the third score.

2. The method of claim 1, wherein the calculating of the first score comprises increasing the first score in response to determining that similarity between an email address associated with the member profile and a name of a member represented by the member profile is below a predetermined threshold.

3. The method of claim 1, wherein the calculating of the first score comprises increasing the first score in response to determining that geographic location indicated in the member profile is inconsistent with geographic location associated with an Internet Protocol (IP) address associated with a login session for the member profile in the on-line connection network system.

4. The method of claim 1, wherein the second machine learning model produces the second score based on respective ranks assigned to connections of the member profile, the respective ranks generated based on affinity between the member profile and a respective connection and a weight that reflects interaction types and intensity between the member profile and a respective connection.

5. The method of claim 1, wherein the executing of the second machine learning model comprises increasing the second score in response to determining that a certain percentage of connections of the member profile are from a certain demographic group.

6. The method of claim 1, wherein the executing of the second machine learning model comprises increasing the second score in response to determining that a certain percentage of connections of the member profile originated from invitations issued from the member profile.

7. The method of claim 1, wherein the third machine learning model is a text classification model configured to recognize whether a message content is indicative of spam.

8. The method of claim 1, wherein the executing of the third machine learning model comprises increasing the third score in response to determining that a number of follow actions initiated from the member profile within a certain time period is greater than a particular threshold value.

9. The method of claim 1, wherein the executing of the third machine learning model comprises increasing the third score in response to determining that the member profile includes a link to a web site previously identified as a spammer web site.

10. The method of claim 1, comprising excluding the member profile from a total count of active member profiles in the on-line connection network system based on the presence of the flag indicating that the member profile is a spammer member profile.

11. A system comprising:
one or more processors; and
a non-transitory computer readable storage medium comprising instructions that when executed by the one or processors cause the one or more processors to perform operations comprising:

accessing a member profile representing a user in an on-line connection network system;

calculating, using a first machine learning model that takes information stored in the member profile as input, a first score indicating consistency of the information stored in the member profile;

comparing the first score to a threshold value and, based on a result of the comparing, executing a second machine learning model that takes information about connections of the member profile in the on-line connection network system as input and produces a second score;

comparing the second score to a further threshold value and, based on a result of comparing the second score to the further threshold value, executing a third machine learning model that takes as input information representing events originated with the member profile in the on-line connection network system and produces a third score; and based on the third score, associating the member profile with a flag indicating that the member profile is a spammer member profile;

wherein the first machine learning model is different than the second machine learning model and the third machine learning model;

wherein the third machine learning model is different than the second machine learning model;

wherein the first score is calculated before the second score and the second score is calculated before the third score.

12. The system of claim 11, wherein the calculating of the first score comprises increasing the first score in response to determining that similarity between an email address associated with the member profile and a name of a member represented by the member profile is below a predetermined threshold.

13. The system of claim 11, wherein the calculating of the first score comprises increasing the first score in response to determining that geographic location indicated in the member profile is inconsistent with geographic location associated with an Internet Protocol (IP) address associated with a login session for the member profile in the on-line connection network system.

14. The system of claim 11, wherein the second machine learning model produces the second score based on respective ranks assigned to connections of the member profile, the respective ranks generated based on affinity between the member profile and a respective connection and a weight that reflects interaction types and intensity between the member profile and a respective connection.

15. The system of claim 11, wherein the executing of the second machine learning model comprises increasing the second score in response to determining that a certain percentage of connections of the member profile are from a certain demographic group.

16. The system of claim 11, wherein the executing of the second machine learning model comprises increasing the second score in response to determining that a certain percentage of connections of the member profile originated from invitations issued from the member profile.

17. The system of claim 11, wherein the third machine learning model is a text classification model configured to recognize whether a message content is indicative of spam.

18. The system of claim 11, wherein the executing of the third machine learning model comprises increasing the third score in response to determining that a number of follow actions initiated from the member profile within a certain time period is greater than a particular threshold value.

19. The system of claim 11, wherein the executing of the third machine learning model comprises increasing the third score in response to determining that the member profile includes a link to a web site previously identified as a spammer web site.

20. One or more non-transitory machine-readable storage media storing instructions which, when executed by one or more processors, cause:
    accessing a member profile representing a user in an on-line connection network system;
    calculating, using a first machine learning model that takes information stored in the member profile as input, a first score indicating consistency of the information stored in the member profile;
    comparing the first score to a threshold value and, based on a result of the comparing, executing a second machine learning model that takes information about connections of the member profile in the on-line connection network system as input and produces a second score;
    comparing the second score to a further threshold value and, based on a result of comparing the second score to the further threshold value, executing a third machine learning model that takes as input information representing events originated with the member profile in the on-line connection network system and produces a third score; and
    based on the third score, associating the member profile with a flag indicating that the member profile is a spammer member profile;
    wherein the first machine learning model is different than the second machine learning model and the third machine learning model;
    wherein the third machine learning model is different than the second machine learning model;
    wherein the first score is calculated before the second score and the second score is calculated before the third score.

* * * * *